June 29, 1948. J. G. KUHN 2,444,103
SLEEVE VALVE INTERNAL-COMBUSTION ENGINE
Filed May 25, 1945 3 Sheets-Sheet 1

INVENTOR
JACKSON G. KUHN
BY HARRIS, KIECH, FOSTER & HARRIS

FOR THE FIRM
ATTORNEYS

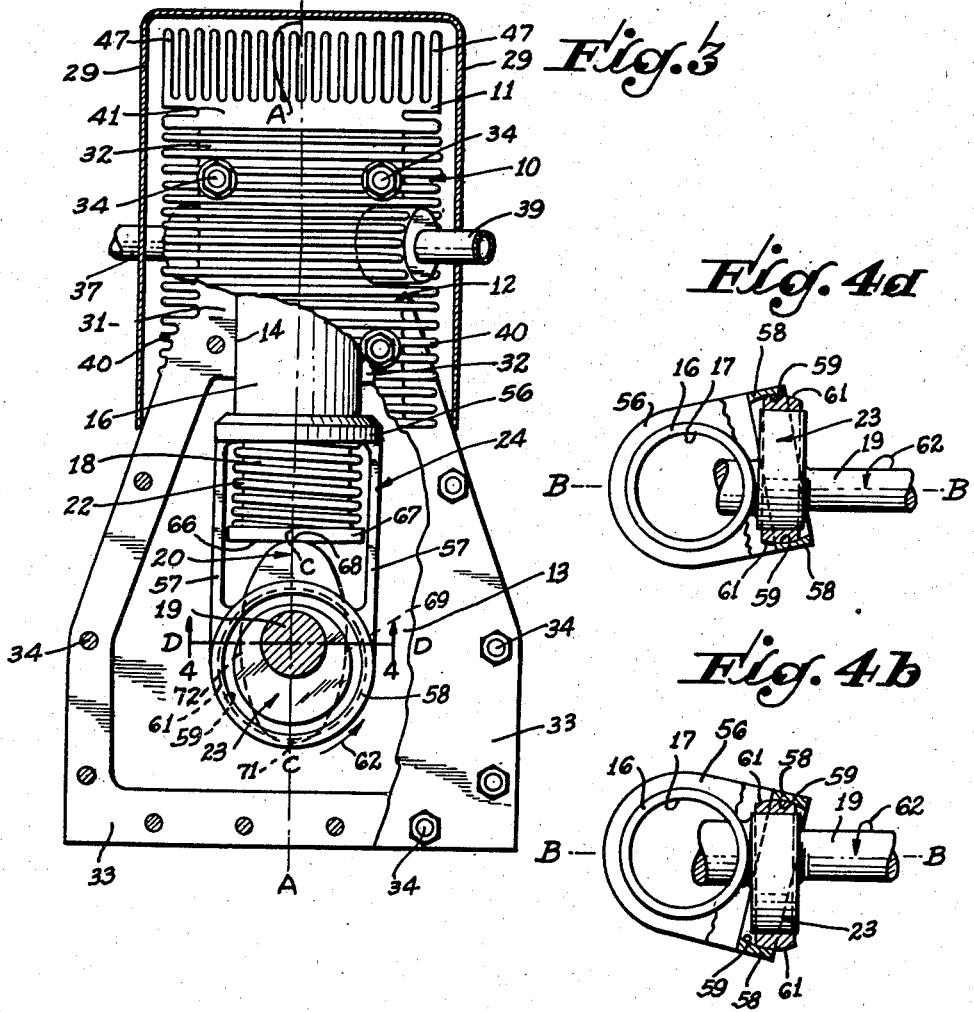

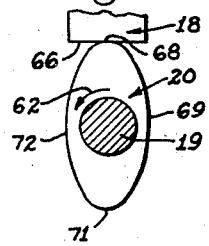
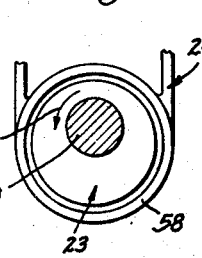
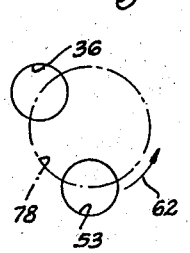
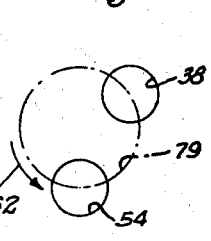
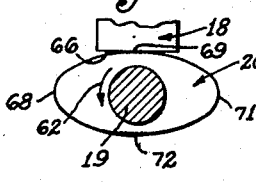
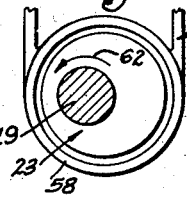
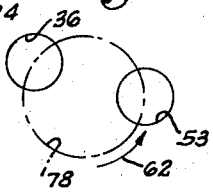
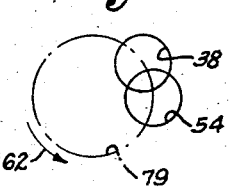
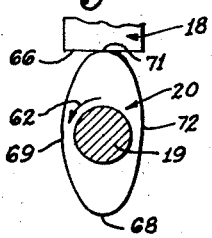
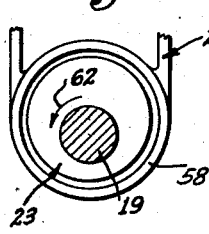
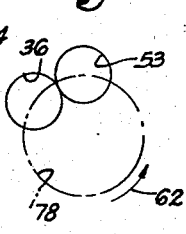
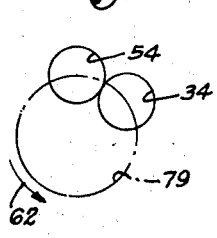
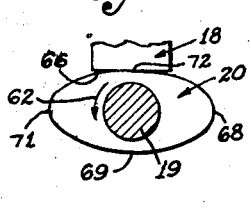
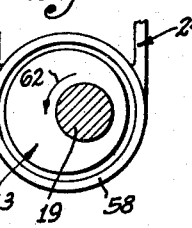
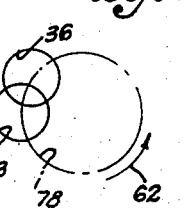
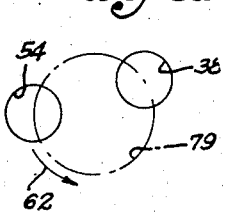
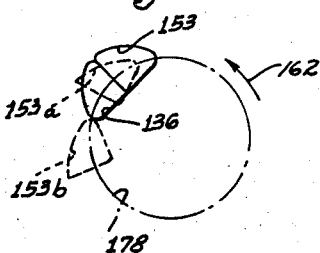

Patented June 29, 1948

UNITED STATES PATENT OFFICE 2,444,103

SLEEVE VALVE INTERNAL-COMBUSTION ENGINE

Jackson G. Kuhn, Glendale, Calif., assignor, by mesne assignments, to Gladden Products Corporation, Glendale, Calif., a corporation of California Application May 25, 1945, Serial No. 595,784

7 Claims. (Cl. 123—81)

My invention relates in general to internal combustion engines and, more specifically, to small engines which are particularly adapted for inexpensive manufacture, assembly, operation, and maintenance.

Artisans and technicians proficient in the internal combustion engine field will appreciate the significance of the statement that there has long been a pressing demand for small internal combustion engines which may be purchased by persons of moderate means and which may be operated and maintained inexpensively. Such an engine is particularly adapted for employment in rural areas which lack conventional electrical power facilities and which are wholly reliant upon alternative sources of power supply. Among the various applications of my invention may be included engines for providing motive power for washing machines, refrigerators, and other household appliances. Engines of this general character may also be employed for powering such small garden implements as cultivators, lawn mowers, spraying equipment, and the like and for powering such mobile vehicles as bicycles. My invention may also be employed advantageously for driving various machine tools such as grinders, drill presses, lathes, and so forth.

I further contemplate an internal combustion engine which is of a sufficiently simple construction to permit manufacture, operation, and maintenance thereof in competition with conventional electric motors of corresponding horsepower ratings, thereby materially amplifying the universality of application thereof.

The foregoing general objectives of my invention have not been realized by conventional internal combustion engines of the capacities under consideration because many of the designers thereof appear to have relied largely upon emulating the attributes of the larger engines and have incorporated these attributes in smaller models to produce exceedingly complex and expensive engines.

Among the primary objectives of my invention, therefore, is the provision of a small internal combustion engine adapted for the development of horsepower ratings which range from fractional values to several horsepower. Another primary objective of my invention is the provision of an engine of this general capacity which is specifically adapted for production and utilization without incurring excessive manufacturing, operating, or maintenance expenses.

I prefer to effect a realization of these and various other objectives and advantages of my invention by employing a single-cylinder, air-cooled engine of the sleeve valve type which is adapted for operation on a four-stroke cycle during each revolution of a power shaft. The reciprocating motion of the piston may be transformed into rotary motion of the power shaft by means of a cam which is secured to the power shaft and is driven by the piston, the cam preferably being elliptical although other forms will suffice. I prefer to achieve the valve action required to attain the four-stroke cycle by securing eccentric means to the power shaft, the eccentric being adapted to drive sleeve valve means to effect combined reciprocation and rotation thereof.

From the foregoing general considerations, it will be apparent that the basic structure of the engine involves only three moving parts, namely the piston, power shaft, and sleeve valve. The structural simplifications attainable by such a combination contribute materially to the production of an inexpensive engine and provide another objective of my invention.

The engine may be adapted for use with the cylinder in either a vertical or a horizontal position to achieve greater universality of application. Lubrication may be effected through employment of the conventional splash system wherein a suitable crankcase is provided, the latter being filled with lubricating oil to a predetermined level to permit the cam and eccentric to dip thereinto and thereby carry oil to locations which require lubrication.

The foregoing general considerations indicate some of the principal objectives and advantages of my invention. These and various other objectives and advantages thereof may be realized by means of the exemplary embodiment described in the following disclosure and shown in the accompanying drawings, which are for illustrative purposes only. With reference to the drawings:

Fig. 3 is an end elevational view thereof taken as indicated by the arrow 3 of Fig. 1;

Fig. 4a is a fragmentary sectional view taken along the line 4—4 of Fig. 3 and illustrates the relative positions of the aforesaid sleeve valve means and eccentric means at the beginning of an exhaust stroke;

Fig. 4b is a fragmentary sectional view similar to Fig. 4a and illustrates the relative positions at the beginning of a compression stroke;

Figures 1, 2:
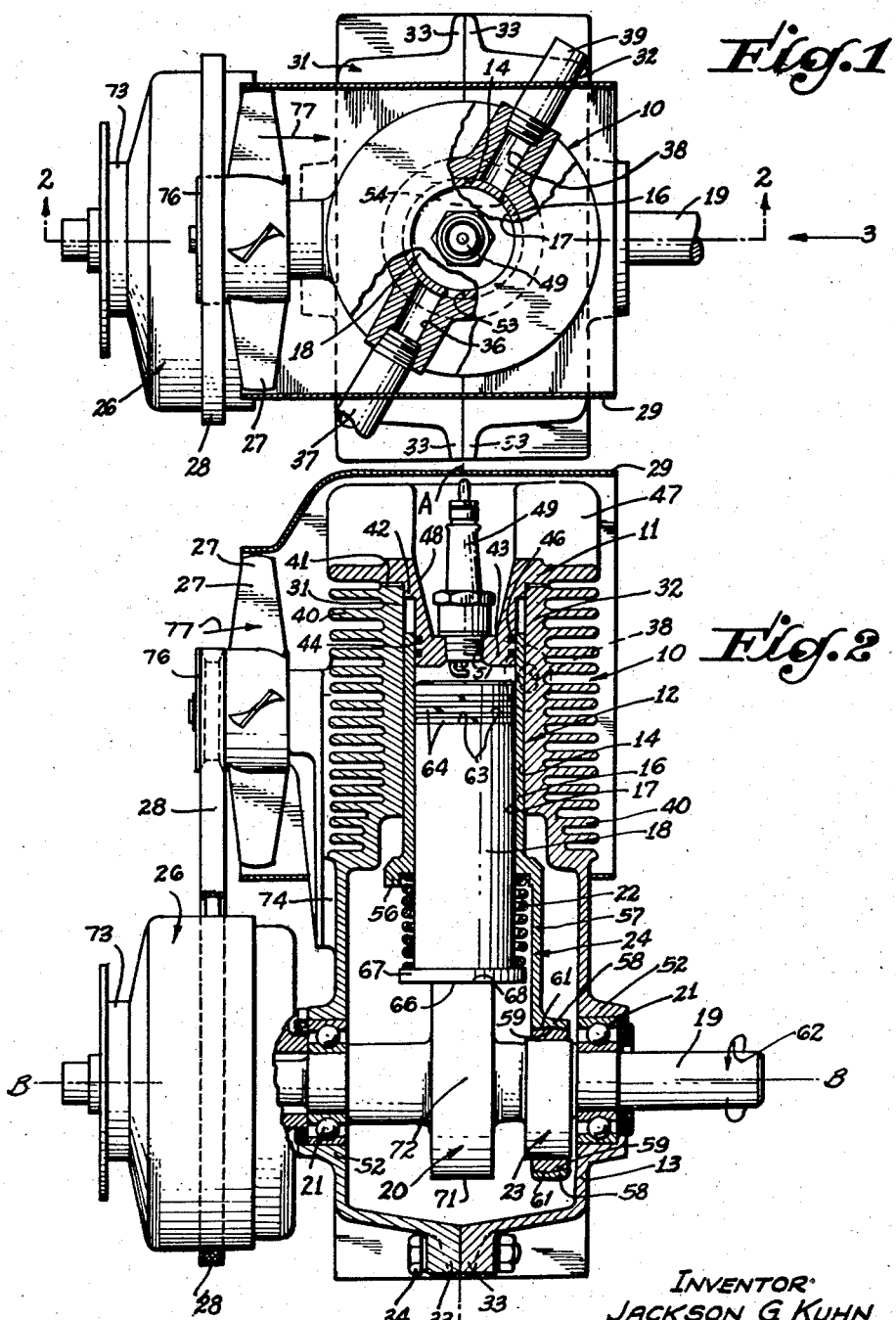
Fig. 1 is a plan view of an exemplary embodiment of the engine, the view being partially in section to illustrate the details of construction more clearly.
Fig. 2 is a side elevational view thereof which is partially sectioned along the line 2—2 of Fig. 1.

Figs. 5a to 5d, inclusive, are schematic diagrams illustrating the positions of the aforesaid cam means and eccentric means and the positions of an intake port and an exhaust port in the sleeve valve means relative to corresponding ports in the cylinder at the beginning of a power stroke;

Figs. 6a to 6d, 7a to 7d, and 8a to 8d, all inclusive are similar to Figs. 5a to 5d and illustrate the various positions at the beginning of an exhaust stroke, an intake stroke, and a compression stroke, respectively; and Fig. 9 is a schematic diagram illustrating the valve action with intake ports of an irregular shape.

Referring particularly to Figs. 1 to 3, inclusive, the engine includes a cylinder which is generally indicated by the numeral 10 and which incorporates a cylinder head 11, a cylinder barrel 12, and a crankcase section 13, the cylinder barrel 12 being provided with a bore 14 therein. Slidably and rotatably disposed within the bore 14 is a sleeve valve means 16, the latter being provided with a concentric bore 17 within which is disposed a reciprocable piston 18. The piston 18 is adapted to drive a rotatable power shaft 19 through an elliptical cam means 20 which is secured thereto, the shaft 19 being rotatably mounted on the crankcase section 13 by bearing assemblies 21. Engagement between the piston 18 and cam means 20 is maintained by a resilient means 22 which is adapted for engagement with the sleeve valve 16 and piston 18 as will be described in detail hereinafter. A circular eccentric means 23 is eccentrically mounted on the power shaft 19 and is adapted to rotate and reciprocate the sleeve valve 16 through an actuating arm 24 as will be described in detail. An end of the power shaft 19 is provided with a magneto-flywheel combination 26 which is adapted to drive a cooling means or fan 27 through the medium of a belt 28. The cylinder head 11 and barrel 12 are enclosed in a suitable housing 29 which serves to control and direct the flow of cooling air emanating from the cooling fan 27.

Referring to the structure of the cylinder 10 in detail, the preferred embodiment illustrated provides for a construction wherein the cylinder barrel 12 and crankcase section 13 are formed integrally, the structure defined thereby being split into two complementary sections 31 and 32 along a parting plane within which lies the longitudinal axis A—A of the cylinder 10. For the purpose of simplifying the manufacture of the engine and reducing the expense thereof, the two sections 31 and 32 are preferably identical and interchangeable, as well as being complementary. Excepting the portion adapted to receive the cylinder head 11, the sections 31 and 32 are provided with peripheral flanges 33 adjacent the aforesaid parting plane, the sections 31 and 32 being secured together by a plurality of bolts 34 which extend through the flanges 33.

The section 31 is provided with an intake port 36 which is adapted to supply the engine with a fuel air mixture from a conventional carburetor (not shown) through an intake pipe 37. The section 32 is similarly provided with an exhaust port 38 and exhaust pipe 39, the intake and exhaust ports 36 and 38 being disposed diametrically opposite each other to make the sections 31 and 32 identical. The cylinder barrel 12 is provided with a plurality of annular cooling fins 40 of any desired thickness and spacing consistent with cooling requirements.

The cylinder head 11, which may be secured to the barrel 12 in any desired manner and is adapted to abut an end 41 thereof, is provided with a cylindrical portion 42 which is adapted for insertion into the cylinder bore 14. The head 11 is also provided with another cylindrical portion 43 which is complementary to and inserted in the bore 17 in the sleeve valve 16, the cylindrical portion 43 being provided with annular grooves 44 therein which retain sealing rings 46. The head 11 is provided with cooling fins 47 and a well 48 for a spark plug 49, the latter communicating with the firing chamber through an opening 51.

The crankcase section 13 is provided with counterbored bosses 52, the latter serving to retain the bearing assemblies 21 which carry the power shaft 19. The crankcase section 13 may be filled with lubricating oil (not shown) to a predetermined level to permit the cam 20 and eccentric 23 to traverse the oil and lubricate the engine by the conventional splash system.

The sleeve valve 16, which is reciprocably and rotatably disposed in the bore 14 is provided with an intake port 53 and exhaust port 54 which are adapted for respective registry with the intake port 36 and exhaust port 38 in the cylinder barrel 12 during appropriate intervals in the operating cycle to be discussed in detail hereinafter. The sleeve valve 16 is provided with an annular shoulder 56 thereon which acts as a seat for and serves to retain the resilient means 22, the latter preferably being a helical spring 22 which embraces the piston 18. Formed integrally with the shoulder 56 is the valve actuating arm 24, the latter having sections 57 which terminate in a circular collar 58 having an arcuate inner peripheral surface 59. The latter is adapted for engagement with a complementarily arcuated surface 61 which is formed on the eccentric 23. As the power shaft 19 rotates in the direction of the arrow 62, the eccentric 23 acts through the arm 24 to cause the sleeve valve 16 to rotate with an oscillatory motion and to reciprocate simultaneously so as to provide the desired valve action which will be described hereinafter. The arcuate engagement surfaces 59 and 61 permit the collar 58 to oscillate angularly relative to the eccentric 23 as illustrated in Figs. 4a and 4b, the magnitude of the angular oscillation of the collar 58 having been exaggerated slightly for illustrative purposes. The small linear displacement of the collar 58 relative to the eccentric 23 (parallel to the axis B—B of the shaft 19) is compensated for by allowing a small amount of play therebetween.

The piston 18, which is reciprocably disposed in the bore 17 in the sleeve valve 16, is provided with a plurality of annular grooves 63, each of which retains a piston ring 64. An end 66 of the piston 18 is provided with an annular flange 67 which serves as a seat for and retains the resilient spring means 22. The latter maintains the end 66 of the piston 18 in slidable engagement with the cam 20, such a slidable follower arrangement having been selected to reduce manufacturing expenses. The cam 20 is preferably elliptical, the ends 68 and 71 of the major axis C—C thereof representing the points of engagement with the piston 18 at the beginning of the power and intake strokes, respectively. The ends 69 and 72 of the minor axis D—D of the elliptical cam 20 similarly represent the points of engagement at the beginning of the exhaust and compression strokes, respectively.

The magneto-flywheel combination 26 is of the conventional type and may be secured to the shaft 19 in any suitable manner (not shown) as is well known in the art. Suitable conductors (not shown) may be included to connect the magneto (not shown) to the spark plug 49 and a suitable spark-timing device (not shown) may also be incorporated. The magneto-flywheel combination 26 is provided with a starting pulley 73 which is adapted for the reception of a cord, rope, or the like (not shown) to start the engine in the conventional manner.

The cooling fan 27 is rotatably mounted on the cylinder barrel 12 by means of a supporting bracket 74, the latter being secured to the barrel 12 below the fins 40 in any appropriate manner (not shown). The fan 27 is provided with and driven by a pulley 76, the latter being driven by the V-belt 28 which is trained thereover and over the periphery of the magneto-flywheel combination 26. The fan 27 propels air into the housing 29 in the direction indicated by the arrow 77, the housing 29 being adapted to control the flow of cooling air and direct the air past the cylinder head 11 and barrel 12 and between the fins 40 and 47.

The foregoing disclosure has eliminated a detailed consideration of the various conventional engine accessories for purposes of simplification. Obviously, any suitable carburetor, magneto, and spark-timing arrangement may be employed and a suitable governing mechanism (not shown) may also be provided. The governor may be driven by the shaft 19 and may, for example, be of the pendulum type wherein a whirling mass responds to the action of centrifugal force to actuate the throttle valve of the carburetor.

The operation of the engine may best be illustrated by a consideration of the schematic diagrams shown in Figs. 5 to 8, inclusive. Figures 5a through 8a (first column) illustrate the relative positions of the piston 18 and cam 20 at the beginning of the power, exhaust, intake, and compression strokes, respectively. Figs. 5b through 8b (second column) represent the corresponding relative positions of the eccentric 23 and valve actuating arm 24. Figs. 5c through 8c (third column) represent the corresponding positions of the intake port 53 in the sleeve valve 16 relative to the intake port 36 in the cylinder barrel 12 and Figs. 5d through 8d (fourth column) similarly represent the relative positions of the exhaust port 54 in the valve sleeve 16 to the exhaust port 38 in the cylinder barrel 12.

Figs. 5a through 5d (top row) represent the various aforesaid positions at the beginning of the power stroke of the piston 18, which will be considered as being 0° (or 360°) of rotation of the power shaft 19. Similarly, Figs. 6a through 6d (second row), 7a through 7d (third row) and 8a through 8d (bottom row) respectively indicate the various aforesaid positions at the beginning of the exhaust, intake, and compression strokes, the latter being considered as representing 90°, 180°, and 270° of rotation of the shaft 19, respectively.

The following description may best be presented by considering specific numerical values for the valve timing with no intention of limiting the scope of the invention thereto. Referring to Fig. 5a, the cam following surface 66 of the piston 18 engages the cam 20 at the point 68 on the periphery thereof, the piston 18 being at top dead center. The eccentric 23 and valve actuating arm 24 are in the positions shown in Fig. 5b and the valve intake and exhaust ports 53 and 54 are in the positions shown in Figs. 5c and 5d, respectively.

As the shaft 19 rotates in the direction indicated by the arrow 62 during the power stroke (0° to 90° of shaft rotation) in response to movement of the piston 18 toward the shaft 19 because of the combustion of the fuel-air mixture in the cylinder bore 14, the cam follower 66 slides to the point 69 as the piston 18 reaches bottom dead center. The eccentric 23 assumes the position shown in Fig. 6b which causes the valve intake and exhaust ports 53 and 54 to describe circular orbits which are indicated by the broken lines 78 and 79, respectively, and which traverse the cylinder intake and exhaust ports 36 and 38, respectively. As indicated in Fig. 6d, the valve exhaust port 54 is in partial registry with the cylinder exhaust port 38 at the beginning of the exhaust stroke, registry having commenced at 67½° of rotation of the shaft 19.

During the exhaust stroke (90° to 180° of shaft rotation), the cam follower 66 moves to point 71 on the cam 20 as indicated in Fig. 7a and the piston 18 reaches top dead center to expel the expended charge. The eccentric 23 rotates to the position shown in Fig. 7b and causes the valve intake and exhaust ports 53 and 54 to assume the positions shown in Figs. 7c and 7d, respectively, the valve exhaust port 54 having been in complete registry with the cylinder exhaust port 38 at 123¾° of shaft rotation and having closed at 180° thereof. As illustrated in Fig. 7c, the valve intake port 53 is beginning to register with the cylinder intake port 36 at the 180° position so that no valve overlap occurs.

During the intake stroke (180° to 270° of shaft rotation), the cam follower 66 slides to point 72 on the cam 20 (Fig. 8a) as the piston 18 again reaches bottom dead center to draw a fresh charge into the cylinder bore 14. The valve intake port 53 completely registered with the cylinder intake port 36 at 236¼° of shaft rotation and is in partial registry therewith at 270°.

During the compression stroke (270° to 360° of shaft rotation), the various components reassume the positions illustrated in Figs. 5a through 5d (0° position), the valve intake port 53 having closed at 292½° of shaft rotation.

For the purpose of simplifying the disclosure of the valve action, the various ports have been illustrated as being circular. It will be understood that the ports may be of any desired shape, the shape preferably being such that the respective ports are in substantially complete registry within a few degrees of shaft rotation after the beginning of registry. This may best be accomplished by employing ports of an irregular shape as illustrated in Fig. 9. The valve intake port 153 is beginning to register with the cylinder intake port 136 as indicated in full lines. The dotted lines 153a indicate substantially complete registry with the cylinder intake port 136 although the valve intake port 153 has moved only a relatively small part of the distance between the beginning of registry as indicated by the full lines 153, and the end of registry, as indicated by the dotted lines 153b. The circular orbit of the valve intake port 153 is indicated by the broken line 178, the direction of motion being indicated by the arrow 162.

It will be apparent to those proficient in the art that the simplified engine construction and operation disclosed heretofore provides an engine which is inexpensive to manufacture, operate and maintain. The number of moving parts has been minimized and complex structures have been avoided throughout. The eccentric means 23 for achieving the desired valve action is extremely simple and reliable and the incorporation of the spring means 22 provides a simple and dependable means for maintaining the desired engagement between the cam means 20 and cam follower 66. Various conventional accessories may be incorporated and any suitable power take-off may be employed in cooperation with the power shaft 19.

Although I have herein described an exemplary embodiment of my invention, have suggested various applications thereof, and have cited various numerical values in conjunction with the description of the valve action thereof, I do not intend to be limited to the specific disclosures contained herein since those proficient in the art will recognize various substitutions to and modifications of my underlying inventive concept; I hereby reserve the right, therefore, to the protection offered by the appended claims and to all such substitutions and modifications as properly come within the scope thereof.

I claim as my invention:

1. In an internal combustion engine, the combination of: a cylinder; sleeve valve means slidably disposed in said cylinder; a rotatable shaft having cam means thereon; means for interconnecting said sleeve valve means and said shaft; a piston slidably disposed in said sleeve valve means and adapted for engagement with said cam means to effect rotation of said shaft; and resilient means adapted for engagement with said sleeve valve means and said piston to maintain said piston in engagement with said cam means.

2. In an internal combustion engine, the combination of: a cylinder; sleeve valve means slidably disposed in said cylinder, said sleeve valve means being provided with an annular shoulder thereon; a rotatable shaft having cam means thereon; means for interconnecting said sleeve valve means and said shaft; a piston slidably disposed in said sleeve valve means and adapted for engagement with said cam means to effect rotation of said shaft, said piston being provided with a peripheral flange thereon; and resilient means disposed between said shoulder and said flange to maintain said piston in engagement with said cam means.

3. In an internal combustion engine which is provided with a single cylinder, the combination of: sleeve valve means adapted for slidable and rotatable disposition in the cylinder; a rotatable shaft having cam means and eccentric means thereon; a piston slidably disposed in said sleeve valve means and adapted for engagement with said cam means to effect rotation of said shaft; means connecting said sleeve valve means and said eccentric means and adapted for actuation by said eccentric means in response to rotation thereof to effect simultaneous reciprocation and rotary oscillation of said sleeve valve means; and resilient means adapted for engagement with said sleeve valve means and said piston to maintain said engagement between said piston and said cam means.

4. In an internal combustion engine, the combination of: a cylinder having an intake port and an exhaust port therein; sleeve valve means slidably and rotatably disposed in said cylinder and having an intake port and an exhaust port therein which are adapted for respective registry with said intake port and said exhaust port in said cylinder; a piston slidably disposed in said sleeve valve means; a rotatable shaft; cam means mounted on said shaft and adapted for engagement with said piston to effect rotation of said shaft during reciprocation of said piston, the configuration of said cam means being such that said piston completes a four-stroke operating cycle during each revolution of said shaft; resilient means adapted for engagement with said sleeve valve means and said piston to maintain said piston in engagement with said cam means; and eccentric means mounted on said shaft and adapted for actuating said sleeve valve means to effect simultaneous reciprocation and rotary oscillation thereof whereby said intake port in said sleeve valve means is brought into registry with said intake port in said cylinder at a predetermined point on said operating cycle and said exhaust port in said sleeve valve means is brought into registry with said exhaust port in said cylinder at another predetermined point on said operating cycle.

5. In an internal combustion engine, the combination of: a cylinder; a rotatable power shaft extending transversely of said cylinder; a sleeve valve movable in said cylinder; a cam on said power shaft; a piston movable in said sleeve valve; resilient means engaging said piston and said sleeve valve for urging said piston into engagement with said cam; and means for moving said sleeve valve in said cylinder.

6. In an internal combustion engine, the combination of: a cylinder; a sleeve valve movable in said cylinder; a piston movable in said sleeve valve; a power shaft extending transversely of said cylinder; a cam on said power shaft; resilient means operatively engaging said piston and said sleeve valve for urging said piston into engagement with said cam; and eccentric means on said power shaft for moving said sleeve valve.

7. In an internal combustion engine, the combination of: a cylinder; a rotatable power shaft extending transversely of said cylinder; a circular member eccentrically mounted on said power shaft; a sleeve valve movable in said cylinder; an annular member connected to said sleeve valve and encircling said circular member; a piston movable longitudinally in said sleeve valve; a cam on said power shaft adapted to engage said piston; and resilient means engaging said sleeve valve and said piston for urging said piston into engagement with said cam.

JACKSON G. KUHN.

REFERENCES CITED

The following references are of record in the file of this patent:

UNITED STATES PATENTS

| Number | Name | Date |
|---|---|---|
| 784,636 | Smith | Mar. 14, 1905 |
| 817,905 | Daniel | Apr. 17, 1906 |
| 1,189,267 | Layman | July 4, 1916 |
| 1,402,695 | Wall | Jan. 3, 1922 |
| 1,639,449 | Baker | Aug. 16, 1927 |
| 1,649,004 | Whitfield | Nov. 15, 1927 |
| 1,779,088 | Davies | Oct. 21, 1930 |
| 1,789,341 | Niven | Jan. 20, 1931 |
| 1,865,493 | Whitfield | July 5, 1932 |
| 2,019,476 | Brownlee | Nov. 5, 1935 |
| 2,136,302 | Leighton | Nov. 8, 1938 |

FOREIGN PATENTS

| Number | Country | Date |
|---|---|---|
| 34,729 | France | Sept. 11, 1929 |
| | (Addition to Pat. 639,669) | |
| 426,680 | Germany | Mar. 15, 1926 |
| 514,286 | Germany | Dec. 10, 1930 |